(12) United States Patent
Contreras et al.

(10) Patent No.: US 6,201,653 B1
(45) Date of Patent: *Mar. 13, 2001

(54) BY-PASS WRITE DRIVERS FOR HIGH-PERFORMANCE DATA RECORDING

(75) Inventors: John T. Contreras; Klaas Berend Klaassen; Jacobus van Peppen, all of San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,505
(22) Filed: Jun. 12, 1998
(51) Int. Cl.[7] ................. G11B 5/09; G11B 5/02; H03B 1/00
(52) U.S. Cl. ................. 360/46; 360/68; 327/110
(58) Field of Search ................. 360/46, 61, 68; 327/110

(56) References Cited

U.S. PATENT DOCUMENTS

| | | | |
|---|---|---|---|
| 4,255,767 | 3/1981 | Frey | 358/301 |
| 4,551,772 | 11/1985 | Sliger | 360/46 |
| 4,816,932 | 3/1989 | Yates | 360/46 |
| 5,121,356 | 6/1992 | Park et al. | 365/203 |
| 5,168,395 | 12/1992 | Klaassen et al. | 360/46 |
| 5,282,094 | 1/1994 | Ngo | 360/46 |
| 5,287,231 | 2/1994 | Shier et al. | 360/68 |
| 5,291,069 | 3/1994 | Gooding et al. | 307/254 |
| 5,291,347 | 3/1994 | Ngo et al. | 360/68 |
| 5,296,975 | 3/1994 | Contreras et al. | 360/46 |
| 5,331,479 | * 7/1994 | Madsen | 360/68 |
| 5,333,081 | 7/1994 | Mitsui | 360/46 |
| 5,343,337 | 8/1994 | Jurneke | 360/63 |
| 5,386,328 | 1/1995 | Chiou et al. | 360/68 |
| 5,394,363 | 2/1995 | Han | 365/189.01 |
| 5,402,052 | 3/1995 | Cheng et al. | 318/696 |
| 5,532,631 | 7/1996 | Ngo et al. | 327/110 |
| 5,869,988 | * 2/1999 | Jusuf et al. | 360/46 |

FOREIGN PATENT DOCUMENTS

| | | |
|---|---|---|
| 61-229206 | 10/1986 | (JP) . |
| 63-173205 | 7/1988 | (JP) . |
| 1-229404 | 9/1989 | (JP) . |
| 2-50305 | 2/1990 | (JP) . |

OTHER PUBLICATIONS

J.A. Bailey et al., Predriver For "H" Configured Write Drive For Magnetic Recording, IBM Technical Disclosure Bulletin, vol. 23 No. 11, Apr. 1981, pp. 5167–5168.

M.L. Leonhardt, Write Driver Circuit, IBM Technical Disclosure Bulletin, vol. 23 No. 9, Feb. 1981, pp. 4312–4313.

* cited by examiner

*Primary Examiner*—W. Chris Kim
(74) *Attorney, Agent, or Firm*—Khanh Q. Tran; Banner & Witcoff, Ltd.

(57) ABSTRACT

A magnetic-head write-driver circuit includes a write-driver circuit and a by-pass driver circuit coupled in parallel to a signal path between the input and the output of the magnetic-head write-driver circuit. The write-driver circuit receives an input signal having transitions and outputs a first write signal related to the input signal. The by-pass driver circuit outputs an assist signal that is coupled to the first write signal to form an output write signal. The assist signal is related to transitions of the first write signal and assists in shortening reversal time of the transitions of a write signal by producing "overshoots" in the write signal at the time of the transitions. Additionally, the assist signal assists in charging and discharging a parasitic capacitance associated with an output of the magnetic-head write-driver circuit. The assist signal can add a current to, and/or enforce a voltage on, the first write signal to form the output write signal.

42 Claims, 7 Drawing Sheets

BY-PASS WRITE DRIVERS FOR HIGH-PERFORMANCE DATA RECORDING

BACKGROUND OF THE INVENTION

1. Field of the Invention

The present invention relates to the field of magnetic data recording. More particularly, the present invention relates to an apparatus and a method for improving data recording performance of a magnetic storage device at high data rates.

2. Description of the Related Art

A write driver (WD) in a magnetic storage device is a circuit that bi-directionally drives a write current through a write head for recording data on magnetic media, such as a magnetic disk. FIG. 1 shows an exemplary disk drive system 10 having a magnetic read/write head 11 that is positioned over a selected track on a magnetic disk 12 for recording data.

One impediment for improving performance of magnetic data recording at high data rates, that is, the speed at which data is written to a magnetic medium, is that the flux reversal time for a transition is slowed by eddy current damping in the core of the write head.

Another impediment for improving performance of magnetic data recording are parasitic capacitances that are associated with silicon devices of the write driver, the inductance and the parasitic capacitance of the write head and the losses due to the interconnect between the write driver and the write head that cause the rise and fall times of the write-current transitions through the write head to increase, thus degrading the performance of the write driver. FIG. 2 is a schematic block diagram showing a parasitic capacitance $C_D$ associated with a write driver WD, an inductance $L_H$, a resistance $R_H$ and a parasitic capacitance $C_H$ associated with the write head, and an interconnect modelled as a transmission line by the distributed network consisting of the inductances $L_I$ and the capacitances $C_I$ between the write driver WD and the write head. The rise and fall times of the write-current transitions are slowed because the write current $I_W$ from the write driver must pass through the network shown in FIG. 2, which essentially forms a low-pass filter, to reach the write head.

The rise- and fall-time increase also degrades data-recording performance by causing nonlinear transition shift (NLTS) effects during write-current transitions and slowing the field transitions in the magnetic field at the pole tips of the write element.

A conventional write driver is typically configured to have current-switching H drivers, such as FET drivers, differential amplifier drivers and current-mirroring H drivers. Such a conventional configuration has a limited current output capability. Consequently, a conventional write driver has limited capability for compensating for the increase in flux reversal time caused by eddy current damping in the write head, the parasitic capacitance associated with the silicon devices of the write driver, the write head impedance and the interconnect losses between the write driver and the write head.

What is needed is a technique that compensates for eddy current dampening effects in the core of a write head, while also compensating for the parasitic capacitance associated with the silicon devices of the write driver, the write head impedance and the interconnect losses between the write driver and the write head to speed up the flux reversal time.

SUMMARY OF THE INVENTION

The present invention provides a technique that compensates for eddy current dampening effects in the core of the write head by providing a write current that temporarily "overshoots" the steady-state write current to decrease the flux reversal time in the write head. Additionally, the present invention provides a technique that compensates for the parasitic capacitance associated with the silicon devices of the write driver, the write head impedance and the interconnect losses between the write driver and the write head.

The advantages of the present invention are provided by a magnetic-head write-driver circuit having a write-driver circuit and a by-pass circuit. The write-driver circuit has a signal path between an input and an output of the magnetic-head write-driver circuit. The write-driver circuit receives an input signal having transitions and outputs a first write signal that is related to the input signal. The by-pass driver circuit is coupled in parallel to the signal path of the write-driver circuit, and outputs an assist signal that is related to transitions of the first write signal and that is coupled to the first write signal to form an output write signal. According to the invention, the assist signal acts to shorten a current reversal time through the write head, by temporarily increasing an amplitude of the output write circuit, and/or to charge and discharge a parasitic capacitance associated with the output of the magnetic-head write-driver circuit by adding a current to, or enforcing a voltage on, the first write signal to form the output write signal. The added signal can correspond to a selected function f(t) that varies either the amplitude of the assist signal or the duration of the assist signal, or both.

BRIEF DESCRIPTION OF THE DRAWING

The present invention is illustrated by way of example and is not limited by the accompanying figures in which like reference numerals indicate similar elements and in which.

DETAILED DESCRIPTION

Figure 1:
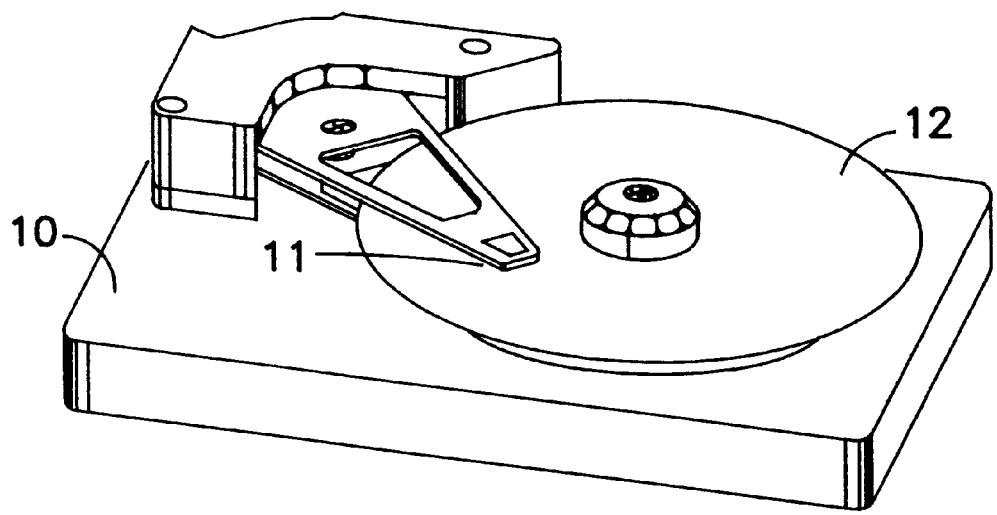
FIG. 1 shows an exemplary disk drive system having a magnetic read/write head with which a by-pass write-driver circuit according to the present invention can be used.
Figure 2:
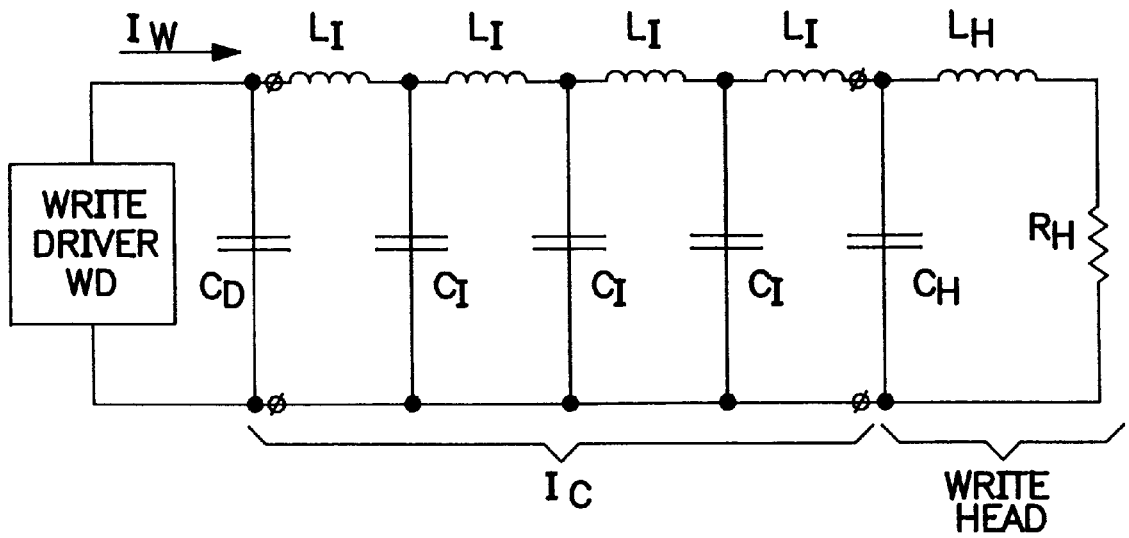
FIG. 2 shows a schematic block diagram of impedances and parasitic components associated with a write driver, a write head and an interconnect between the write driver and the write head.

The present invention provides a class of write-driver circuits, referred to herein as "by-pass write drivers" (BP WDs), that use current or voltage addition techniques, thereby improving data recording performance at high data rates in magnetic storage systems, such as exemplary magnetic disk drive system 10 shown in FIG. 1. The by-pass write-driver circuit topologies of the present invention outperform conventional write-driver circuit topologies by reducing the flux reversal time in the write head used for recording data by temporarily increasing the write current after each write current reversal, and by reducing Non-Linear Transitions Shift (NLTS) effects during the writing process.

Figure 6:
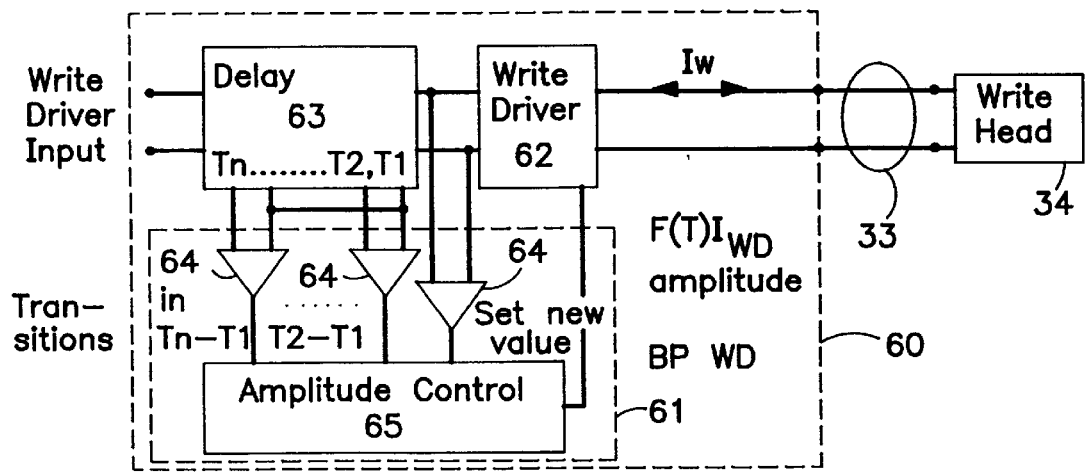
FIG. 6 is a schematic block diagram of a circuit topology for an Nth Delay Connection by-pass write-driver circuit according to the present invention.
Figure 7:
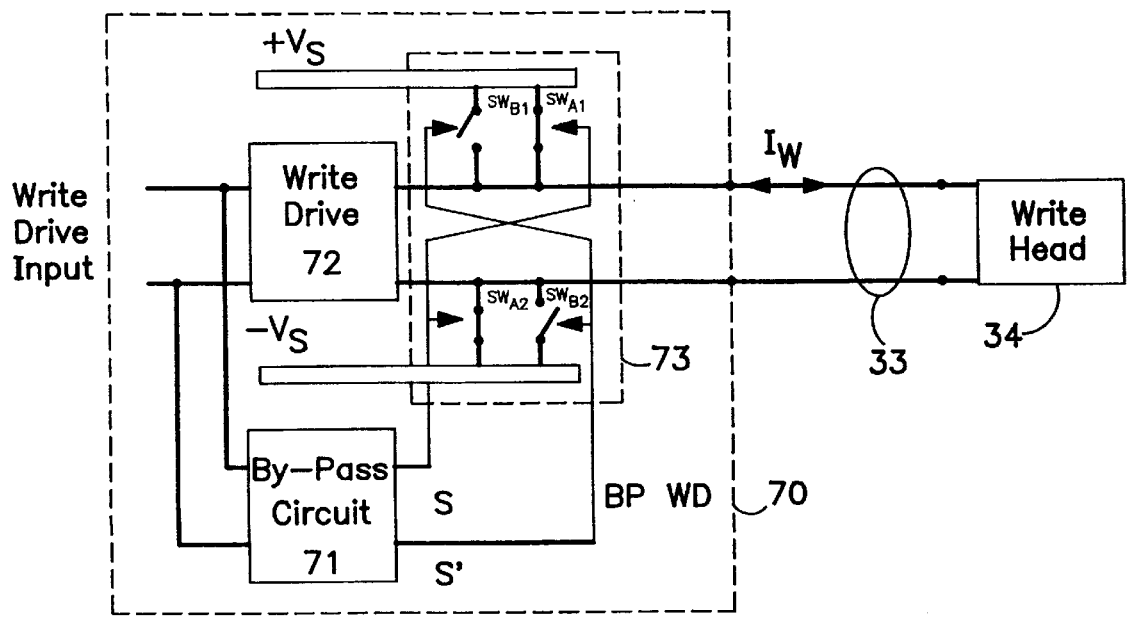
FIG. 7 is a schematic block diagram of a circuit topology for a Voltage Override by-pass write-driver circuit according to the present invention.

The present invention provides several topologies for BP WDs, such as a k-th Stage Connection topology (FIGS. 3–5), an Nth Delay Connection topology (FIG. 6), and a Voltage Override topology (FIG. 7). A k-th Stage connection BP WD, as used herein, means a by-pass circuit of the present invention is connected between the input of the k-th stage (k=1, 2, . . . , N) of a write-driver circuit and the output of the write-driver circuit. For example, a 4th Stage Connection topology has a by-pass circuit connected between the input of the 4th stage and the output of the write driver circuit.

Figure 3:
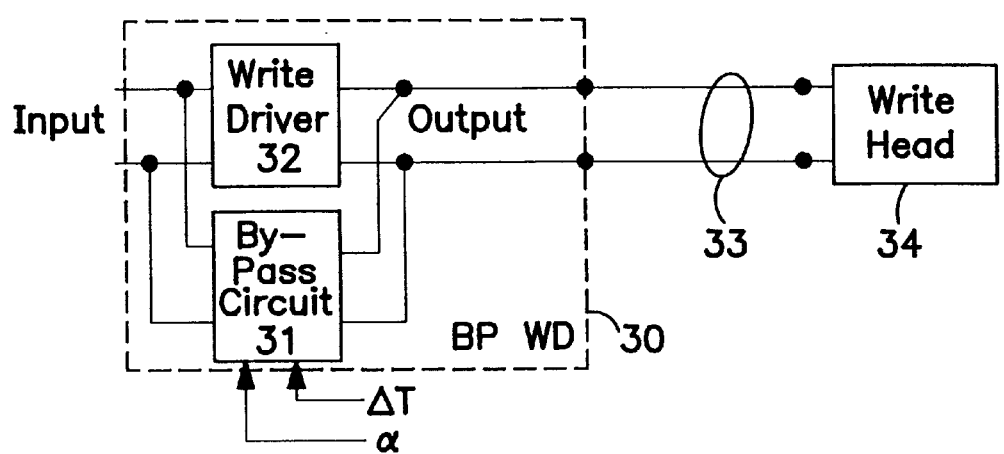
FIG. 3 is a schematic block diagram of a circuit topology for a k-th Stage Connection by-pass write-driver circuit according to the present invention.

FIG. 3 shows a schematic block diagram of a general circuit topology for a k-th Stage Connection BP WD circuit 30 according to the present invention. Bypass write-driver circuit 30 includes a by-pass circuit 31 that is connected between the input and the output of a write-driver circuit 32. The output of BP WD circuit 30 is connected through an interconnect 33 to a write head 34. According to the invention, write-driver circuit 32 can be a conventional single-path write-driver circuit. By-pass circuit 31 provides a parallel path to the path through write-driver circuit 32 that assists with write-current transitions. Write equalization parameters $\alpha$ and $\Delta T$ are input to by-pass circuit 31 for optimizing BP WD 30 for a particular interconnect 33 and/or write head 34. Equalization parameters $\alpha$ and $\Delta T$ respectively control the initial amplitude and duration of the current or voltage generated by by-pass circuit 31.

Figure 4:
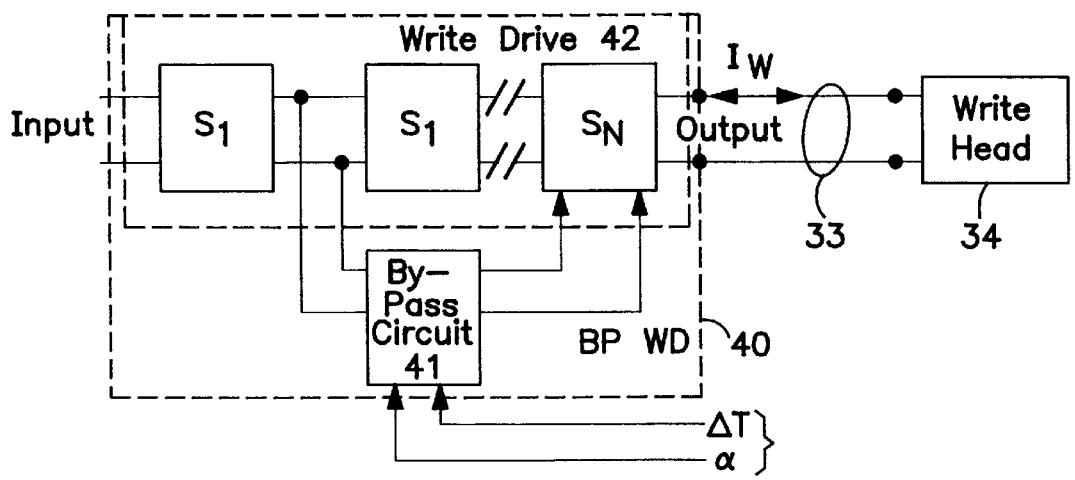
FIG. 4 is a schematic block diagram of a general circuit topology for a k-th Stage Connection by-pass write-driver circuit according to the present invention.

FIG. 4 is a schematic block diagram of a general circuit topology for a 2nd Stage Connection BP WD circuit 40 according to the present invention. BP WD circuit 40 typically includes a write-driver circuit 42 having multiple stages $S_1$ through $S_N$. According to the invention, a by-pass circuit can be connected between the input of any intermediate stage $S_k$ and the output of the write-driver circuit. The architecture of WD circuit (circuit 42) determines the optimal location for connecting a BP circuit. In the exemplary circuit of FIG. 4, BP WD circuit 40 includes a by-pass circuit 41 connected to write-driver circuit 42 at the input to the second stage $S_2$ and to the output of write-driver circuit 42 at the Nth stage $S_N$.

Figure 5:
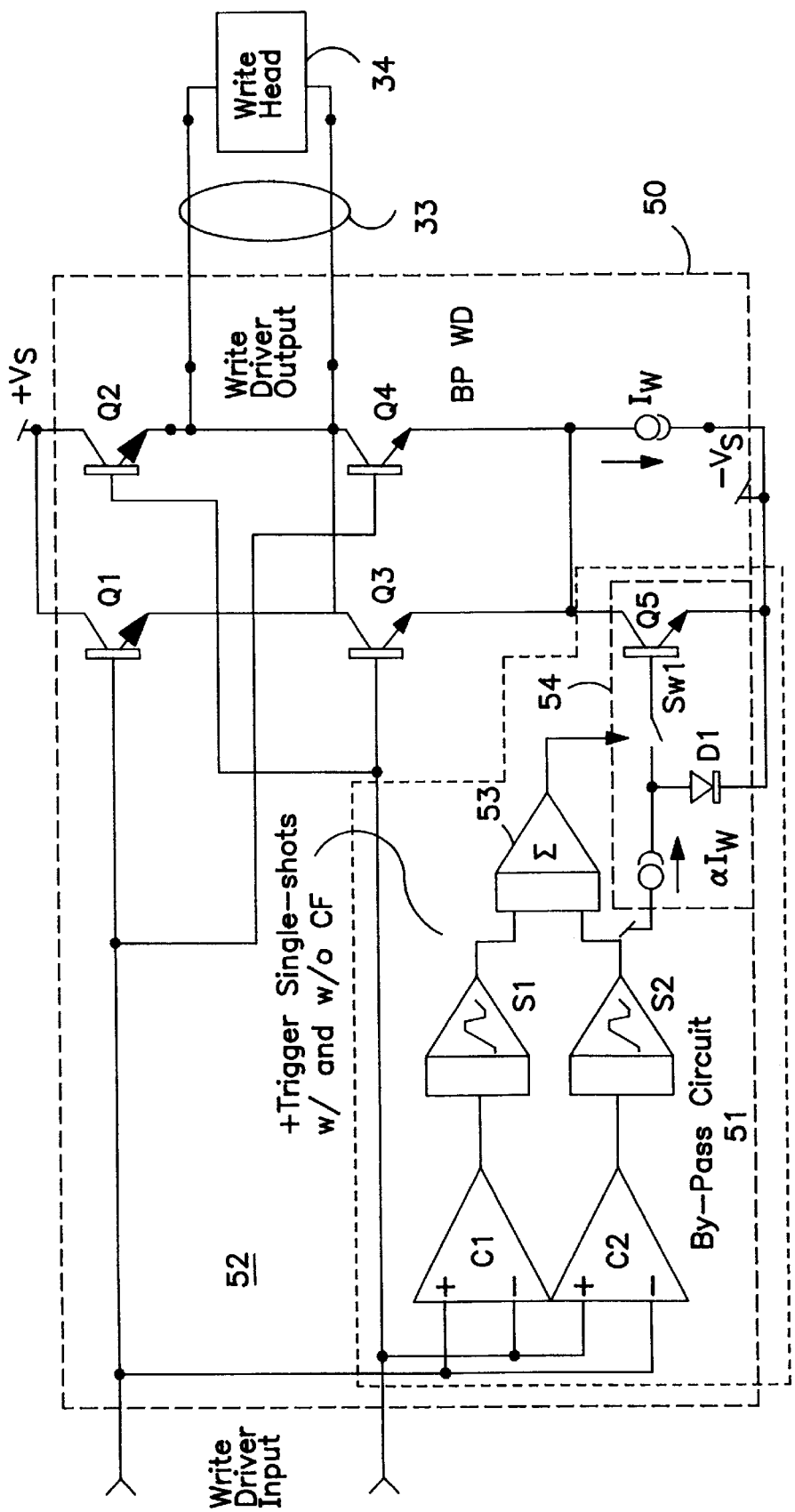
FIG. 5 is a more detailed schematic block diagram of the topology for a k-th Stage Connection by-pass write-driver circuit according to the present invention.

FIG. 5 is a schematic block diagram of another circuit topology for an k-th Stage Connection BP WD circuit 50 according to the present invention. BP WD circuit 50 includes a by-pass circuit 51 connected between the input and part of the output of a write-driver circuit 52. For the configuration of FIG. 5, by-pass circuit 51 includes comparators C1 and C2, positive trigger single-shot circuits S1 and S2, a summing block 53, and a current source 54 formed by a diode D1, a transistor Q5 and a current source $\alpha I_W$. $I_W$ defined to be the base-to-peak amplitude of the write current.

Comparator C1 detects positive-going transitions in the input signal, while comparator C2 detects negative-going transitions. When a transition is detected, single-shot circuit S1 or S2 generates a pulse signal that is applied to current source 54 through summing block 53. The pulse signal applied to current source 54 causes current source 54 to generate a discrete current increase in the write current output that assists in charging and discharge the parasitic capacitance associated with the silicon devices of the write-driver circuit, the write head impedance and the interconnect losses between the write driver and the write head.

The characteristics of the current change depend on the specific output of the single-shot circuits S1 and S2. That is, single-shot circuits S1 and S2 may have a simple square voltage pulse waveform or a complex voltage pulse waveform that generates a desired current waveform at the output of BP WD circuit 50. When a complex voltage pulse waveform is desired, single-shot circuits S1 and S2 each output a waveform corresponding to the desired circuit function (CF).

FIG. 6 is a schematic block diagram of a circuit topology for an Nth Delay Connection BP WD circuit 60 according to the present invention. BP WD circuit 60 includes a by-pass circuit 61 connected between a delayed write signal path 63 and part of the output of a write-driver circuit 62. By-pass circuit 61 includes difference circuits 64 that detect a time period between transitions of the input signal, such as by using triggered single-shot circuits having varying pulse widths in a well-known manner. An amplitude control circuit 65 is coupled to the output of difference circuits 64 and controls the amplitude of an assist current $I_W$ based on the duration of time between the write data transitions. By-pass write-driver circuit 60 differs from BP WD circuit 50, which generates discrete write-current changes, by providing continuous write-current changes at the output of write-driver circuit 60. The amplitude of the write current is modified using a delayed write signal, based on the write data frequency, that is, the spacing of the write-current transitions. Typically, the amplitude of the write current is increased as the write data frequency increases. The continuously-controlled current output from BP WD circuit 60 is optimized to the write-current transition frequency, thereby compensating for the eddy current dampening in the core of the write head and compensating for the parasitic capacitance appearing at the WD output.

FIG. 7 is a schematic block diagram of a circuit topology for a Voltage Override BP-WD circuit 70 according to the present invention. BP WD circuit 70 includes a by-pass circuit 71 connected between the k-th stage and a switching circuit 73 at the output of a write-driver circuit 72. Switching circuit 73 includes switches $SW_{A1}$, $SW_{A2}$, $SW_{B1}$ and $SW_{B2}$, which can be formed in a well-known manner using bipolar transistors or field effect transistors. Control signals S and S' turn on an appropriate pair of switches $SW_{A1}$–$SW_{A2}$ and $SW_{B1}$–$SW_{B2}$ to connect the write lines to $\pm V_S$ for generating a voltage pulse at the output of BP WD circuit 70 that assists in compensating for the eddy current dampening in the core of the write head and in charging and discharging the parasitic capacitance appearing at the output of BP WD circuit 70. Control signals S and S' are both off when there is no write-current transition present.

Even though conventional write-driver circuits are typically current drivers, such as write-driver circuits 32, 42, 52, 62 and 72 shown in FIGS. 3–7, respectively, such a conventional write-driver circuit can use either a current and/or voltage signal to drive the interconnect and write head. Accordingly, the present invention provides different BP WD circuit topologies suitable for adding current or voltage for compensating for parasitic capacitance.

Figure 8:
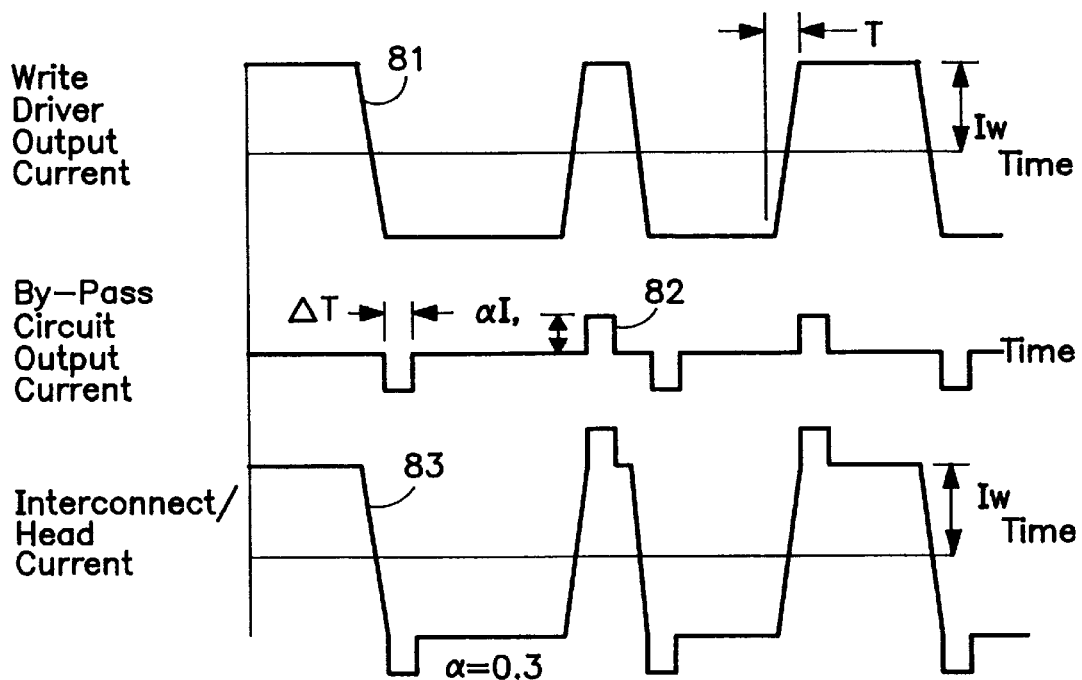
FIG. 8 is a waveform diagram showing exemplary current waveforms associated with a current step addition technique according to the present invention.

A current step addition technique requires a by-pass circuit to create current steps during write-current transitions that are superimposed on the write-driver circuit output current $I_W$, thereby producing an additional current step at each write-current transition. The duration and amplitude of the current step is set by the write equalization parameters $\Delta T$ and $\alpha$, respectively. The k-th Stage or the Nth Delay Connection BP WD topologies shown in FIGS. 3–6 are the most appropriate circuit topologies for a current injection technique. FIG. 8 is a waveform diagram showing exemplary current waveforms 81–83 that are associated with a current step addition technique according to the present invention. Waveform 81 corresponds to the output current waveform of a conventional write-driver circuit (circuit 32, 42 and 52) as a function of time. The amplitude of waveform 81 has a maximum absolute value of $I_W$ and a rise time of $\tau$. Waveform 82 corresponds to a current waveform output from a by-pass circuit (circuit 31, 41 and 51) having a maximum absolute amplitude of $\alpha I_W$ and a duration of $\Delta T$ value. It should be noted that the relative timing of waveform 82 with respect to that of waveform 81 indicated in FIG. 8 is arbitrarily chosen as an example only. The pulses in waveform 82 may be made to coincide with the slopes (i.e., the reversal) of the write waveform 81. Waveform 83 is the superposition of waveforms 81 and 82. For the Nth Delay connection BP WD topology of FIG. 6, the $\alpha$ scaling factor is a function of the write-current transition rate. Also, as explained above, the write-current signal can be delayed so that a current function f(t) can be established at a desired time, such as the start of a wire-current transition.

Current function injection techniques, according to the invention, require a by-pass circuit to create a current function during write-current transitions. A scaling factor is used for determining the initial amplitude of the pulse output by the by-pass circuit, while the current function f(t) is selected based on the desirable waveform of the write current providing the write head optimum magnetic performance.

Figure 9:
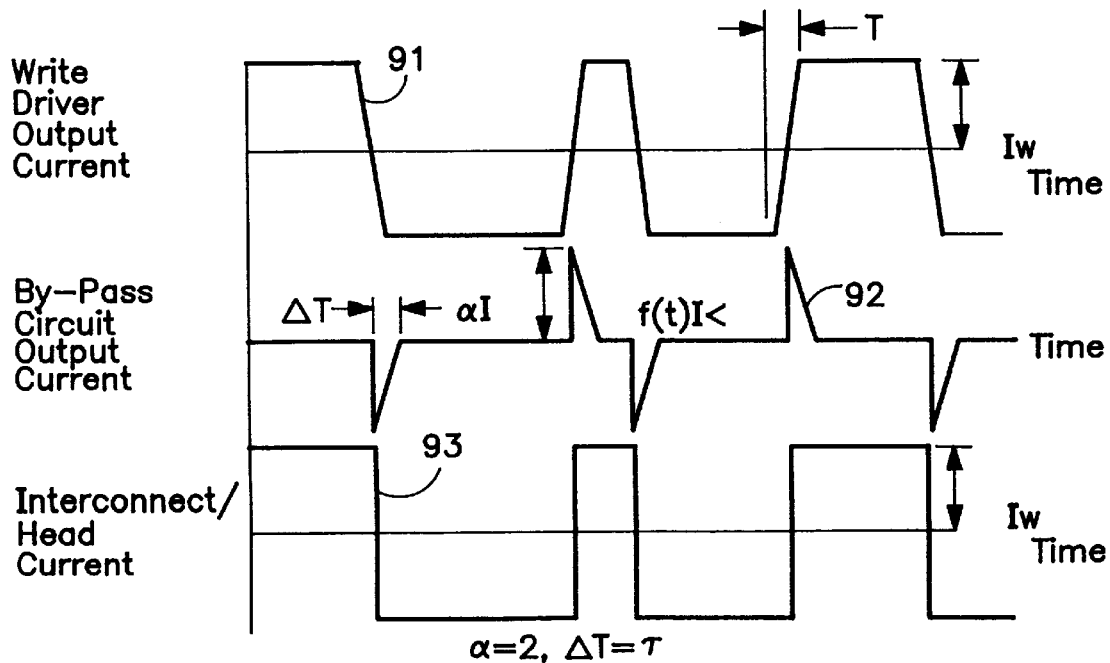
FIG. 9 is a waveform diagram showing exemplary waveforms associated with a current function addition technique according to the present invention.

FIG. 9 is a waveform diagram showing exemplary waveforms 91–93 associated with a current function f(t) injection technique according to the present invention. Waveform 91 corresponds to the output current waveform of a write-driver circuit (circuit 52) as a function of time. The amplitude of waveform 91 has an absolute value of $I_W$ and a rise time of $\tau$. Waveform 92 corresponds to a current waveform output from a by-pass circuit (circuit 51) having a maximum absolute amplitude of $\alpha I_W$, a ramp function waveform and a duration of $\Delta T$ value for compensating for the write-current rise and fall times $\tau$ output by the write-driver circuit. Here, switch SW1 would have a continuous function instead of a discrete function. The control voltage for SW1 would then form the desired function f(t) shown in FIG. 9. Waveform 93 is the superposition of waveforms 91 and 92. This exemplary compensation creates a desired square write current waveform 93. Additionally, the write-current signal output by the by-pass circuit can be delayed so that the current function f(t) can be placed at a desired time, such as at the start of a write current transition. The k-th Stage Connection BP WD topologies of FIGS. 3–5 are the most appropriate circuit topologies for a current function injection technique.

Figure 10:
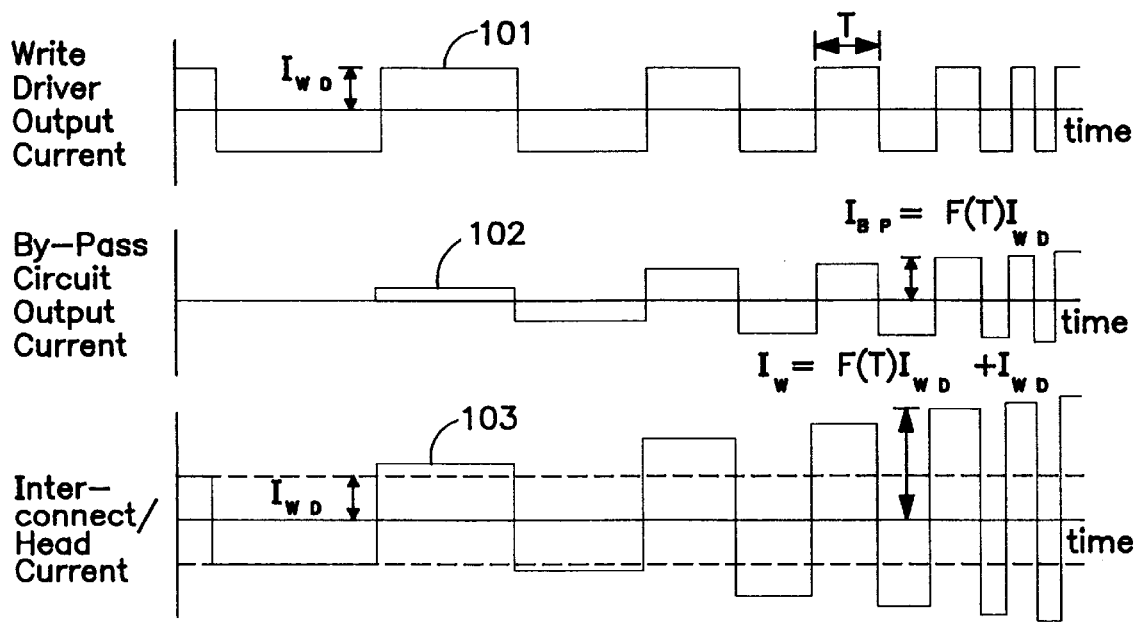
FIG. 10 is a waveform diagram showing exemplary waveforms associated with a variable amplitude addition technique according to the present invention.

FIG. 10 is a waveform diagram showing exemplary waveforms 101–103 associated with a variable amplitude injection technique according to the present invention. The Nth Delay Connection BP WD topology of FIG. 6 is the most appropriate for a variable amplitude injection technique. Waveform 101 corresponds to the output current waveform of a write-driver circuit (circuit 62) as a function of time. The amplitude of waveform 101 has an absolute value of $I_{WD}$. Waveform 102 corresponds to a current waveform output from a by-pass circuit (circuit 61) having a variable absolute amplitude of $F(T)I_{WD}$, where T is a time (period) between successive transitions and F(T) is the functional dependence of the by-pass current $F(T)I_{WD}$ on T. Waveform 103 is the superposition of waveforms 101 and 102. The variable amplitude injection technique of the present invention modulates the amplitude of the write-current with the write current transition frequency (period of T). This particular technique maintains the write-current amplitude after a transition, as opposed to the two previous injection techniques. Further, the amplitude varies only at the time of the next transition. Consequently, there is a continuous change in the write-current amplitude as a function of the write-current transition frequency, as shown in FIG. 10.

For low frequency write-current transitions, the write current $I_W$ is generated by only the write-driver circuit. For higher transition frequencies, the write current is generated by the write-driver circuit and the by-pass circuit, in which case the write current has an instantaneous amplitude given by:

$$I_W = F(T) \times I_{WD} + I_{WD},$$

where F(T) depends on the interval time T, and $I_{WD}$ is the amount of current generated by the WD circuit. For example, when $$T_S \geq T_O, F(T) = 0,$$

and when $$T_S \leq T_O, F(T) = \alpha(T_O - T_S),$$

where $T_0$ is a selected transition time period, $T_S$ is the time between subsequent write-current transitions, and $\alpha$ is a scaling constant.

Figure 11:
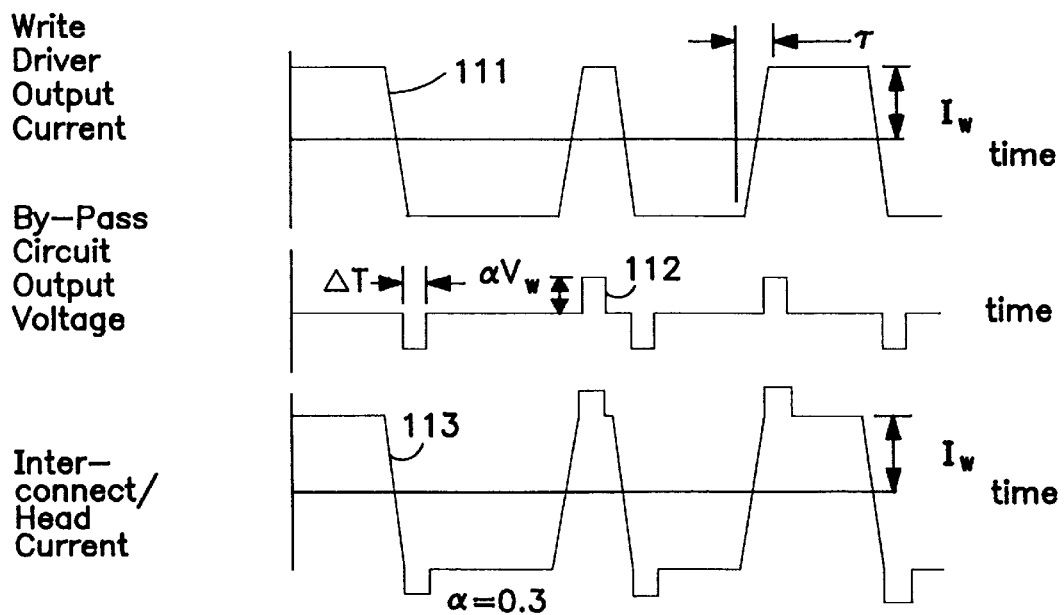
FIG. 11 is a waveform diagram showing exemplary waveforms associated with a voltage override technique according to the present invention.

A voltage override technique of the present invention requires the by-pass write driver circuit to create voltage steps ($V_W$) on the output of the WD circuit at each write-current transition for charging the parasitic capacitance $C_D$ much faster than the WD circuit 72 can. The duration and amplitude of the voltage step is set by the write equalization parameters $\Delta T$ and $\alpha V_W$, respectively. The Voltage Override BP WD circuit topology of FIG. 7 is the most appropriate topology to use for a voltage step addition technique. FIG. 11 is a waveform diagram showing exemplary waveforms 111–113 associated with a voltage step addition technique according to the present invention. Waveform 111 corresponds to the output current waveform of a write-driver circuit (circuit 72) as a function of time. Waveform 111 has a maximum absolute amplitude of $I_W$ and rise time of $\tau$. Waveform 112 corresponds to a voltage waveform output from a by-pass circuit (circuit 71) having a maximum absolute amplitude of $\alpha V_W$ and a duration of $\Delta T$ value. Waveform 113 is the resulting current waveform showing the effect of parallelling voltage waveform 112 to the output of write-driver circuit 72 by connecting the write lines to $\pm V_S$. The $\alpha V_W$ amplitude indicated in FIG. 11 can be conveniently maximized to $V_S$ by the switching circuit 73.

While the present invention has been described in connection with the illustrated embodiments, it will be appreciated and understood that modifications may be made without departing from the true spirit and scope of the invention.

What is claimed is:

1. A magnetic-head write-driver circuit, comprising:
   a write-driver circuit receiving an input signal and outputting a first write signal related to the input signal, the first write signal having transitions, the write-driver circuit having a signal path between an input and an output of the write-driver circuit; and
   a by-pass driver circuit coupled in parallel to the signal path of the write-driver circuit, the by-pass driver circuit outputting an assist signal that is superimposed on the first write signal and adds a voltage to the first write signal to form an output write signal, the assist signal being related to transitions of the first write signal, the by-pass driver circuit including a switch circuit connected to a first voltage and a second voltage, the assist signal being formed by the switch circuit simultaneously connecting the first voltage and the second voltage to the output of the write-driver circuit.

2. The magnetic-head write-driver circuit according to claim 1, wherein the assist signal acts to shorten a current reversal time of transitions in the output write signal.

3. The magnetic-head write-driver circuit according to claim 2, wherein the assist signal further adds a current to the first write signal to form the output write signal.

4. The magnetic-head write-driver circuit according to claim 1, wherein the first and second voltages are power supply voltages.

5. The magnetic-head write-driver circuit according to claim 1, wherein the assist signal acts to temporarily increase an amplitude of the output write signal.

6. The magnetic-head write-driver circuit according to claim 5, wherein the assist signal further adds a current to the first write signal to form the output write signal.

7. The magnetic-head write-driver circuit according to claim 1, wherein the assist signal charges and discharges a parasitic capacitance associated with an output of the magnetic-head write-driver circuit.

8. The magnetic-head write-driver circuit according to claim 7, wherein the assist signal further adds a current to the first write signal to form the output write signal.

9. The magnetic-head write-driver circuit according to claim 1, wherein the assist signal further adds a current to the first write signal to form the output write signal.

10. The magnetic-head write-driver circuit according to claim 9, wherein the added current signal corresponds to a selected function f(t).

11. The magnetic-head write-driver circuit according to claim 10, wherein the selected function f(t) varies one of an amplitude of the assist signal and a duration of the assist signal.

12. The magnetic-head write-driver circuit according to claim 9, wherein the write-driver circuit includes a plurality of stages, and
    wherein the by-pass driver circuit is coupled in parallel to the signal path of the write-driver circuit between an input to a selected stage of the write-driver circuit and at least part of the output of the write-driver circuit.

13. A method of generating a write signal for a magnetic write head, the method comprising the steps of:
    receiving an input signal having transitions;
    outputting a first write signal related to the input signal;
    generating an assist signal in parallel to a signal path between the input signal and the first write signal, the assist signal being related to transitions of the write signal and being formed by the first write signal being connected simultaneously to first and second voltages through a switch circuit; and
    forming an output write signal by combining the assist signal and the first write signal by adding a voltage to the first write signal.

14. The method according to claim 13, wherein the assist signal acts to shorten a current reversal time of transitions in the output write signal.

15. The method according to claim 14, wherein the assist signal further includes a current signal, and
    wherein the step of forming the output write signal further adds the current signal into the first write signal to form the output write signal.

16. The method according to claim 13, wherein the assist signal acts to temporarily increase an amplitude of the output write circuit.

17. The method according to claim 16, wherein the assist signal further includes a current signal, and
    wherein the step of forming the output write signal further adds the current signal into the first write signal to form the output write signal.

18. The method according to claim 13, wherein the assist signal charges and discharges a parasitic capacitance associated with the output write signal.

19. The method according to claim 18, wherein the assist signal further includes a current signal, and
    wherein the step of forming the output write signal further adds the current signal into the first write signal to form the output write signal.

20. The method according to claim 13, wherein the assist signal further includes a current signal, and
    wherein the step of forming the output write signal further adds the current signal into the first write signal to form the output write signal.

21. The method according to claim 20, wherein the step of generating the assist signal generates the current signal corresponding to a selected function F(t).

22. The method according to claim 21, wherein the selected function varies one of an amplitude of the assist signal and a duration of the assist signal.

23. The method according to claim 20, wherein the step of generating the assist signal generates the assist signal in parallel to at least a portion of the signal path between the input signal and the first write signal.

24. The method according to claim 13, wherein the first and second voltages are power supply voltages.

25. A disk drive system having a magnetic-head write-driver circuit, the magnetic-head write-driver circuit comprising:
    a write-driver circuit receiving an input signal and outputting a first write signal related to the input signal, the first write signal having transitions, the write-driver circuit having a signal path between an input and an output of the write-driver circuit; and
    a by-pass driver circuit coupled in parallel to the signal path of the write-driver circuit, the by-pass driver circuit outputting an assist signal that is superimposed on the first write signal and adds a voltage to the first write signal to form an output write signal, the assist signal being related to transitions of the first write signal, the by-pass driver circuit including a switch circuit connected to a first voltage and a second voltage, the assist signal being formed by the switch circuit simultaneously connecting the first voltage and the second voltage to the output of the write-driver circuit.

26. The disk drive system according to claim 25, wherein the assist signal acts to shorten a current reversal time of transitions in the output write signal.

27. The disk drive system according to claim 26, wherein the assist signal further adds a current to the first write signal to form the output write signal.

28. The disk drive system according to claim 25, wherein the assist signal acts to temporarily increase an amplitude of the output write signal.

29. The disk drive system according to claim 28, wherein the assist signal further adds a current to the first write signal to form the output write signal.

30. The disk drive system according to claim 25, wherein the assist signal charges and discharges a parasitic capacitance associated with an output of the magnetic-head write-driver circuit.

31. The disk drive system according to claim 30, wherein the assist signal further adds a current to the first write signal to form the output write signal.

32. The disk drive system according to claim 25, wherein the assist signal further adds a current to the first write signal to form the output write signal.

33. The disk drive system according to claim 32, wherein the added current signal corresponds to a selected function f(t).

34. The disk drive system according to claim 33, wherein the selected function f(t) varies one of an amplitude of the assist signal and a duration of the assist signal.

35. The disk drive system according to claim 25, wherein the write-driver circuit includes a plurality of stages, and
wherein the by-pass driver circuit is coupled in parallel to the signal path of the write-driver circuit between an input to a selected stage of the write-driver circuit and at least part of the output of the write-driver circuit.

36. The disk drive system according to claim 25, wherein the first and second voltages are power supply voltages.

37. A magnetic-head write-driver circuit, comprising:
a write-driver circuit receiving an input signal and outputting a first write signal related to the input signal, the first write signal having transitions, the write-driver circuit having a signal path between an input and an output of the magnetic-head write-driver circuit, the write-driver circuit further including a delay circuit detecting a transition frequency of the input signal, the delay circuit including a difference circuit detecting a duration of time between transitions of the input signal and outputting a delay signal that is related to the detected duration of time between transitions of the input signal; and
a by-pass driver circuit responsive to the delay signal by generating an assist signal that is coupled to the first write signal to form an output write signal, the assist signal being related to the detected duration of time between transitions of the input signal.

38. The magnetic-head write-driver circuit of claim 37, wherein the by-pass driver circuit controls an amplitude of the assist current based on the duration of time between transitions of the input signal.

39. A method of generating a write signal for a magnetic write head, the method comprising steps of:
receiving an input signal having transitions;
outputting a first write signal related to the input signal;
detecting a duration of time between transitions of the input signal;
generating an assist signal in parallel to a signal path between the input signal and the first write signal, the assist signal being related to the detected duration of time between transitions of the input signal; and
forming an output write signal by combining the assist signal on the first write signal.

40. The method according to claim 39, further comprising a step of controlling an amplitude of the assist current based on the duration of time between transitions of the input signal.

41. A disk drive system having a magnetic-head write-driver circuit, the magnetic-head write-driver circuit comprising:
a write-driver circuit receiving an input signal and outputting a first write signal related to the input signal, the first write signal having transitions, the write-driver circuit having a signal path between an input and an output of the magnetic-head write-driver circuit, the write-driver circuit further including a delay circuit detecting a transition frequency of the input signal, the delay circuit including a difference circuit detecting a duration of time between transitions of the input signal and outputting a delay signal that is related to the detected duration of time between transitions of the input signal; and
a by-pass driver circuit responsive to the delay signal by generating an assist signal that is coupled to the first write signal to form an output write signal, the assist signal being related to the detected duration of time between transitions of the input signal.

42. The disk drive system of claim 41, wherein the by-pass driver circuit controls an amplitude of the assist current based on the duration of time between transitions of the input signal.

* * * * *